US008626079B2

(12) United States Patent
Lee et al.

(10) Patent No.: US 8,626,079 B2
(45) Date of Patent: Jan. 7, 2014

(54) LINK ADAPTATION METHOD AND APPARATUS IN WIRELESS COMMUNICATION SYSTEM

(75) Inventors: Il-Gu Lee, Seoul (KR); Chanho Yoon, Daejon (KR); Eun-Young Choi, Daejon (KR); Hun-Sik Kang, Daejon (KR); Minho Cheong, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1163 days.

(21) Appl. No.: 12/177,605

(22) Filed: Jul. 22, 2008

(65) Prior Publication Data

US 2009/0156148 A1    Jun. 18, 2009

(30) Foreign Application Priority Data

Dec. 12, 2007  (KR) .................. 10-2007-0128750
Mar. 24, 2008  (KR) .................. 10-2008-0026807

(51) Int. Cl.
*H04B 1/00* (2006.01)
*H04B 7/00* (2006.01)

(52) U.S. Cl.
USPC ........ 455/69; 455/522; 455/226.2; 455/234.2

(58) Field of Classification Search
USPC ........ 455/232.1–253.2, 226.1–226.4, 522, 69
See application file for complete search history.

(56) References Cited

U.S. PATENT DOCUMENTS

| 4,716,563 | A | * | 12/1987 | Roust | 370/529 |
| 4,748,684 | A | * | 5/1988 | Wright, Jr. | 455/182.3 |
| 5,627,857 | A | * | 5/1997 | Wilson | 375/219 |
| 5,940,743 | A | * | 8/1999 | Sunay et al. | 455/69 |
| 5,946,607 | A | * | 8/1999 | Shiino et al. | 455/234.1 |
| 6,038,435 | A | * | 3/2000 | Zhang | 455/234.1 |
| 6,101,179 | A | * | 8/2000 | Soliman | 370/342 |
| 6,301,485 | B1 | * | 10/2001 | Lee | 455/522 |
| 6,498,927 | B2 | * | 12/2002 | Kang et al. | 455/245.2 |
| 6,510,188 | B1 | * | 1/2003 | Isaksen et al. | 375/345 |
| 6,731,703 | B2 | * | 5/2004 | Kurihara | 375/345 |
| 6,898,198 | B1 | * | 5/2005 | Ryan et al. | 370/338 |
| 6,968,166 | B2 | * | 11/2005 | Yang | 455/234.1 |
| 7,085,334 | B2 | * | 8/2006 | Burke et al. | 375/345 |
| 7,602,865 | B2 | * | 10/2009 | Choi | 375/345 |
| 7,869,408 | B2 | * | 1/2011 | Seals et al. | 370/333 |
| 2002/0042256 | A1 | * | 4/2002 | Baldwin et al. | 455/232.1 |
| 2002/0142745 | A1 | * | 10/2002 | Kang et al. | 455/232.1 |

(Continued)

FOREIGN PATENT DOCUMENTS

KR    1020040005295 A    1/2004
KR    1020060013238 A    2/2006

OTHER PUBLICATIONS

"Link Adaptation Strategy for IEEE 802.11 WLAN via Received Signal Strength Measurement" in international Conference on Communications, vol. 2, pp. 1108-1113, 2003.

*Primary Examiner* — Edward Urban
*Assistant Examiner* — Rui Hu
(74) *Attorney, Agent, or Firm* — Kile Park Reed & Houtteman PLLC

(57) ABSTRACT

Provided is a link adaptation method and apparatus in wireless communication system. The method, includes: amplifying a received signal; converting the amplified signal into a digital signal; calculating digital signal strength; and calculating the received signal strength based on the digital signal strength and a gain of said amplifying a received signal.

8 Claims, 18 Drawing Sheets

(56) References Cited

U.S. PATENT DOCUMENTS

| | | | |
|---|---|---|---|
| 2003/0027537 A1* | 2/2003 | Kimura | 455/232.1 |
| 2003/0032402 A1* | 2/2003 | Asano | 455/234.1 |
| 2004/0017790 A1* | 1/2004 | del Prado et al. | 370/333 |
| 2004/0062326 A1* | 4/2004 | Burke et al. | 375/345 |
| 2004/0097209 A1* | 5/2004 | Haub et al. | 455/242.1 |
| 2005/0208961 A1* | 9/2005 | Willenegger | 455/522 |
| 2007/0032198 A1* | 2/2007 | Sakamoto | 455/69 |
| 2007/0197179 A1* | 8/2007 | Billsberry | 455/232.1 |
| 2008/0070535 A1* | 3/2008 | Liou | 455/232.1 |
| 2011/0105070 A1* | 5/2011 | Li et al. | 455/226.2 |

* cited by examiner

LINK ADAPTATION METHOD AND APPARATUS IN WIRELESS COMMUNICATION SYSTEM

CROSS-REFERENCE(S) TO RELATED APPLICATIONS

The present invention claims priority of Korean Patent Application Nos. 10-2007-0128750 and 10-2008-0026807, filed on Dec. 12, 2007 and Mar. 24, 2008, which are incorporated herein by reference.

BACKGROUND OF THE INVENTION

1. Field of the Invention

The present invention relates to a link adaptation method and apparatus in wireless communication system; and, more particularly, to a method for measuring received signal strength and a method for controlling a transmission parameter according to the measured received signal strength.

This work was supported by the IT R&D program for MIC/IITA [2006-S-014-02, "Development of IEEE 802.11n Modem & RF Chip-sets with Data Rate 200 Mbps"].

2. Description of Related Art

In a wireless communication system, a channel state is changed by causes such as interference, noise, propagation route, and attenuation to thereby deteriorate the performance of the wireless communication system and make normal communication impossible. Accordingly, a link adaptation method for controlling a transmission parameter according to a wireless channel state and providing communication optimized to the channel state has been studied.

There are three conventional link adaptation methods. First, there is an auto rate fallback (ARF) method which is most generally used. The ARF method is a method for sensing packet reception failure through cyclic redundancy checking (CRC) and lowering a transmission speed by one step when a packet reception failure value is higher than a predetermined value. The ARF method can be easily realized but does not follow the change of the channel and is not helpful in entire system throughput.

Second, there is a Signal-to-Noise Ratio (SNR) method. The SNR method is applied when finely divided Media Access Control Protocol Data Unit (MAC MPDU) is transmitted by measuring the SNR upon receiving the packet. The SNR method has a fast response speed for channel change but it is complicated to realize hardware to exactly measure the SNR.

Third, there is a method using received signal strength (RSS). Since the received signal strength has linear relationship with the SNR on average, the channel state is estimated by measuring strength of the received signal. Accordingly, a transmitting end can determine and transmit a transmission parameter. Subsequently, a receiving end receives the transmission parameter, measures received signal strength and transmits the received signal strength after link adaptation. These procedures are repeated in this method.

The method using the received signal strength has the fastest response speed through adaptation to the channel change on the basis of a packet unit. However, since the receiving end should measure strength before a signal received through an antenna is amplified, there is a problem that hardware complexity increases by connecting an individual analog-to-digital (ADC) converter prior to an amplifying unit. Also, when a signal exceeding a conversion threshold range or too small signal is inputted, it is difficult to exactly measure the received signal strength.

SUMMARY OF THE INVENTION

An embodiment of the present invention is directed to providing a link adaptation method and apparatus in a wireless communication system for simply and exactly measuring received signal strength.

The objects of the present invention are not limited to the above-mentioned ones. Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for measuring received signal strength in a wireless communication system, including: amplifying a received signal; converting the amplified signal into a digital signal; calculating digital signal strength; and calculating the received signal strength based on the digital signal strength and a gain of said amplifying a received signal.

In accordance with another aspect of the present invention, there is provided a link adaptation method of a wireless communication system, including: amplifying a received signal of a forward channel and converting the amplified signal into a digital signal; calculating the received signal strength based on digital signal strength and an amplification gain; and controlling a transmission parameter of a reverse channel according to the calculated received signal strength.

In accordance with another aspect of the present invention, there is provided a system for measuring received signal strength in a wireless communication system, including: an amplifying means for amplifying a received signal; a converting means for converting the amplified signal into a digital signal; a measuring means for calculating digital signal strength and calculating received signal strength based on the digital signal strength and a gain of the amplifying means.

In accordance with another aspect of the present invention, there is provided a a link adaptation system of a wireless communication system, including: a received signal strength measuring means for amplifying a received signal of a forward channel, converting the amplified signal into a digital signal, and calculating received signal strength based on digital signal strength and an amplification gain; and a transmission parameter control means for controlling a transmission parameter of a reverse channel according to the calculated received signal strength.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
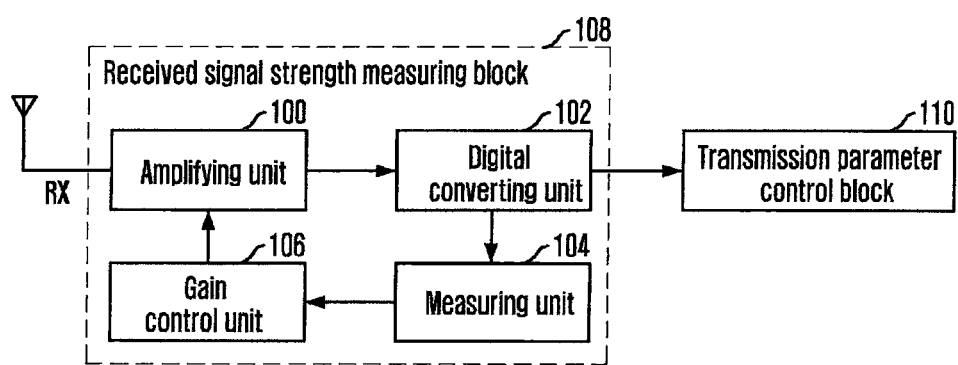
FIG. 1 is a block diagram showing a receiving end of a wireless communication system in accordance with an embodiment of the present invention.

FIG. 1 is a block diagram showing a receiving end of a wireless communication system in accordance with an embodiment of the present invention. The receiving end includes a received signal strength measuring block 108 and a transmission parameter control block 110. The transmission parameter control block 110 controls a transmission parameter of a next reverse channel packet to be transmitted based on received signal strength of a forward channel measured in the received signal strength measuring block 108.

The received signal strength measuring block 108 includes an amplifying unit 100, a digital converting unit 102, a measuring unit 104, and a gain control unit 106. The amplifying unit 100 includes an amplifier for amplifying a received weak radio signal. The digital converting unit 102 represents an analog-to-digital converter (ADC) for converting an analog signal into a digital signal. The measuring unit 104 measures strength of the digital signal converted in the digital converting unit 102. The gain control unit 106 controls an amplification gain in the amplifying unit 100 according to the digital signal strength measured in the measuring unit 104.

The received signal strength measuring block 108 calculates the received signal strength of the receiving end based on the digital signal strength measured in the measuring unit 104 and the amplification gain of the amplifying unit 100. That is, since the digital signal strength is measured by performing digital-conversion after summating the amplification gain with the received signal strength, it is possible to reversely figure out the received signal strength based on the acquired digital signal strength and the amplification gain. Accordingly, the signal strength received in the receiving end can be simply measured without adding an individual ADC prior to the amplifying unit 100.

Since the measured received signal strength shows a channel state changing on time and space by causes such as interference, noise, a propagation route, and attenuation, it is possible to optimize and transmit a transmission parameter such as a transmission speed, a modulation method, and a code rate according to the channel state. The transmission parameter control block 110 controls the transmission parameter to thereby perform link adaptation on the wireless communication system.

Since the amplification gain control procedure of the gain control unit 106 and the received signal strength measuring procedure of the received signal strength measuring block 108 can be performed in the middle of receiving a preamble part of the packet, the rest part of the packet is received based on the determined amplification gain and the transmission parameter determined by the measured received signal strength is applied to a case where the receiving end transmits a next packet.

Figure 2:
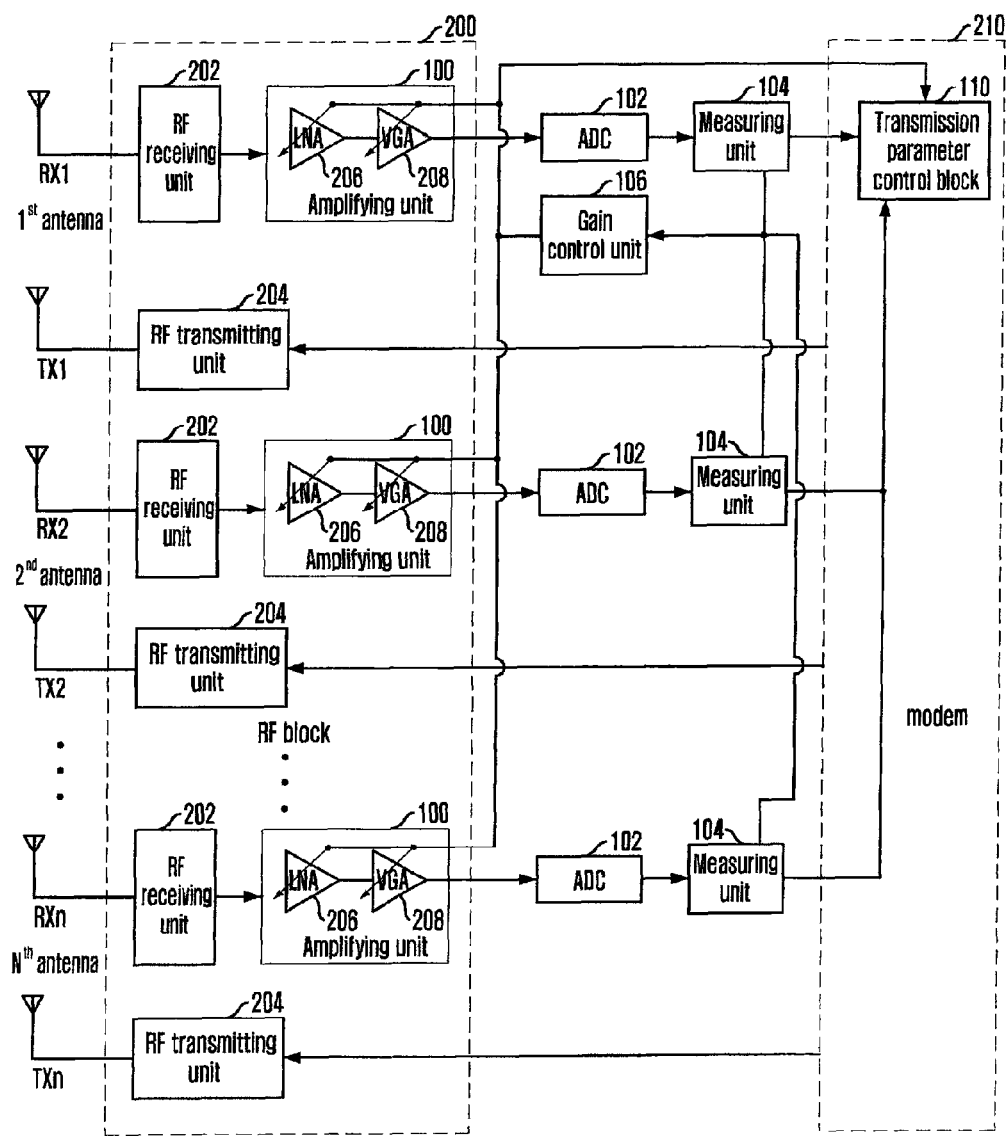
FIG. 2 shows a wireless communication station using a multiple antenna in accordance with an embodiment of the present invention.

FIG. 2 shows a wireless communication station using a multiple antenna in accordance with an embodiment of the present invention. A wireless communication station 220 includes an antenna, a Radio Frequency (RF) block 200 and a modem 210.

The RF block 200 includes an RF receiving unit 202, an RF transmitting unit 204 and the above-mentioned amplifying unit 100. The modem 210 includes the transmission parameter control block 110. There are an ADC 102, the measuring unit 104 and the gain control unit 106 between the RF block 200 and the modem 210 but its configuration may be changed for the ADC 102, the measuring unit 104 and the gain control unit 106 to be included in the RF block 200 or the modem 210.

In the embodiment of the present invention shown in FIG. 2, the amplifying unit 100 includes a Low Noise Amplifier (LNA) 206 and a Variable Gain Amplifier (VGA) 208.

The LNA 206 is located directly in a side of the RF receiving unit 202 and amplifies the radio received signal while minimizing noise. It is general that the LNA 206 controls the amplification gain differently according to the mode of each level such as High, Medium and Low in the gain control unit 106.

The VGA 208 amplifies baseband after the signal amplified in the LNA 206 is converted into a baseband signal. The gain control unit 106 can control the amplification gain of the VGA 208. Also, the gain control unit 106 can control the amplification gain of the entire receiving end.

The received signal strength measuring procedure of the received packet is performed in the same manner described above. The modem 210 transmits a next packet to the transmission parameter, which is determined in the transmission parameter control block 110 based on the received signal strength, through the RF transmitting unit 204. The station receiving the packet transmitted from the wireless communication station 220 transmits a next packet through the same link adaptation procedure and communication is performed by repeating the same procedure.

Figure 3:
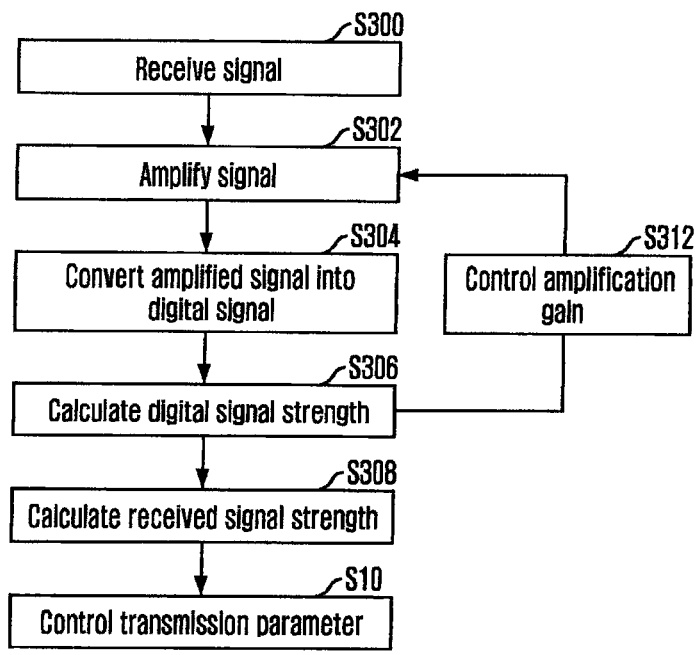
FIG. 3 is a flowchart describing a method for adapting a link by measuring received signal strength and controlling a transmission parameter in accordance with an embodiment of the present invention.

FIG. 3 is a flowchart describing a method for adapting a link by measuring received signal strength and controlling a transmission parameter in accordance with an embodiment of the present invention.

The received signal strength measuring and link adapting procedure of the present invention described above will be described sequentially. The received signal strength measuring and link adapting procedure includes the procedures of receiving a signal at step S300, amplifying the received signal at step S302, converting the amplified signal into a digital signal at step S304, calculating the strength of the converted digital signal at step S306, and controlling amplification gain of the signal amplifying step S302 based on the calculated digital signal strength at step S312. In the embodiment of the present invention, a procedure of controlling the amplification gain not to be over the threshold range of the digital signal converting step S304 at step S312 will be described in detail with reference to FIGS. 5A to 5C.

The received signal strength is calculated at step S308 based on the calculated digital signal strength and the amplification gain. The transmission parameter such as a transmission speed, a modulation method, and a code rate is controlled according to the channel state at step S310. The transmission parameter is pre-determined as follows.

In Table 1, a modulation and coding selection (MCS) level of Institute of Electrical and Electronics Engineers (IEEE) 802.11a according to the channel state is pre-defined as an embodiment of the present invention. In Table 1, a modulation method, a code rate, and a transmission speed are defined for each MCS level and SNR required for achieving 10% Packet Error Rate (PER) for the transmission parameter of each MCS level is shown. The SNR has linear relationship with the received signal strength on average.

TABLE 1

| Mode | Modulation | Code rate | Rate in 20 MHz | Required SNR [dB] for 10% PER (example) |
|---|---|---|---|---|
| 0 | BPSK | ½ | 6 | 8 |
| 1 | BPSK | ¾ | 9 | 9 |
| 2 | QPSK | ½ | 12 | 10 |
| 3 | QPSK | ¾ | 18 | 11 |
| 4 | 16-QAM | ½ | 24 | 12 |
| 5 | 16-QAM | ¾ | 36 | 14 |
| 6 | 64-QAM | ⅔ | 48 | 18 |
| 7 | 64-QAM | ¾ | 54 | 20 |

In Table 2, the MCS level of IEEE 802.11n according to the channel state is pre-defined as an embodiment of the present invention.

TABLE 2

| MCS index | number of spatial streams | Modulation | Code rate | Rate in 20 MHz | Required SNR [dB] for 10% PER (example) | Rate in 40 MHz | Required SNR [dB] for 10% PER (example) |
|---|---|---|---|---|---|---|---|
| 0 | 1 | BPSK | ½ | 6.5 | 10 | 13.5 | 8 |
| 1 | 1 | QPSK | ½ | 13 | 11 | 27 | 10 |
| 2 | 1 | QPSK | ¾ | 19.5 | 11.5 | 40.5 | 12 |
| 3 | 1 | 16-QAM | ½ | 26 | 12 | 54 | 12.5 |
| 4 | 1 | 16-QAM | ¾ | 39 | 14 | 81 | 13 |
| 5 | 1 | 64-QAM | ⅔ | 52 | 18 | 108 | 16 |
| 6 | 1 | 64-QAM | ¾ | 58 | 19 | 121.5 | 18 |
| 7 | 1 | 64-QAM | ⅚ | 65 | 20 | 135 | 20 |
| 8 | 2 | BPSK | ½ | 13 | 13 | 27 | 13 |
| 9 | 2 | QPSK | ½ | 26 | 14 | 54 | 14 |
| 10 | 2 | QPSK | ¾ | 39 | 15 | 81 | 15 |
| 11 | 2 | 16-QAM | ½ | 52 | 17 | 108 | 16 |
| 12 | 2 | 16-QAM | ¾ | 78 | 20 | 162 | 20 |
| 13 | 2 | 64-QAM | ⅔ | 104.52 | 24 | 216 | 23 |
| 14 | 2 | 64-QAM | ¾ | 117 | 26 | 243 | 26 |
| 15 | 2 | 64-QAM | ⅚ | 130 | 27 | 270 | 28 |

As shown in Tables 1 or 2, the transmission parameter is controlled by defining the MCS level according to the received signal strength and selecting a proper MCS level according to the measured received signal strength.

Figure 4:
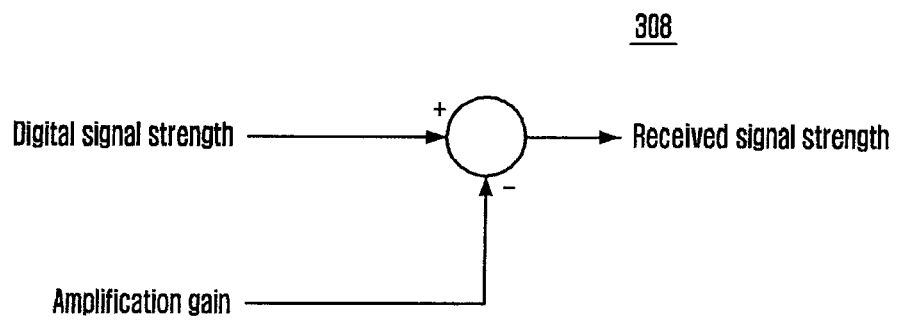
FIG. 4 shows a received signal strength calculating step based on the digital signal strength and the amplification gain in accordance with an embodiment of the present invention.

FIG. 4 shows the received signal strength calculating step S308 based on the digital signal strength and the amplification gain in accordance with an embodiment of the present invention.

Since the digital signal strength is measured by amplifying the received signal at the step S302 and performing conversion into digital signal at step S304, reversely, the received signal strength can be calculated based on the digital signal strength and the amplification gain at step S308. That is, as shown in FIG. 4, the received signal strength can be calculated by subtracting the amplification gain from the digital signal strength.

The subtracting operation is derived from the operation of adding the amplification gain at the step S302 having the signal strength on the basis of dB unit. When the unit of the signal strength is changed, the amplifying step S302 may be a multiplying operation. In this case, a dividing operation by the amplification gain is required.

Figure 5A:
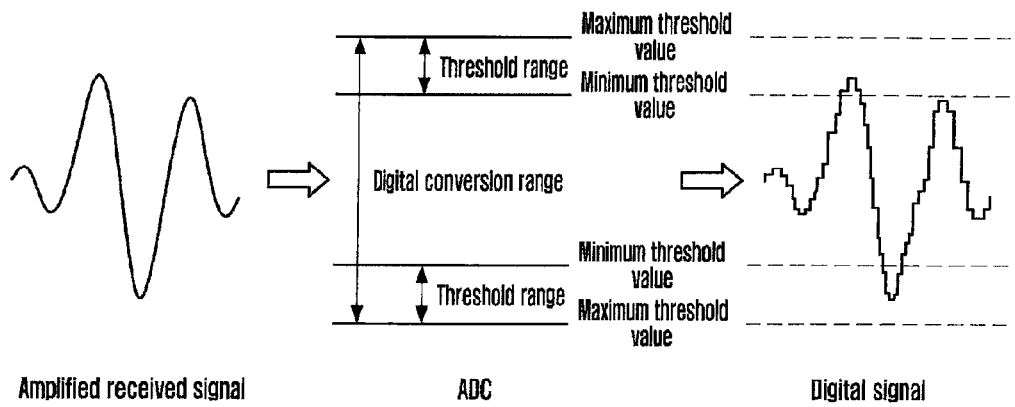
FIGS. 5A to 5C are flowcharts describing a method for controlling an amplification gain for a digital signal to be within the maximum threshold range of conversion.
Figure 5B:
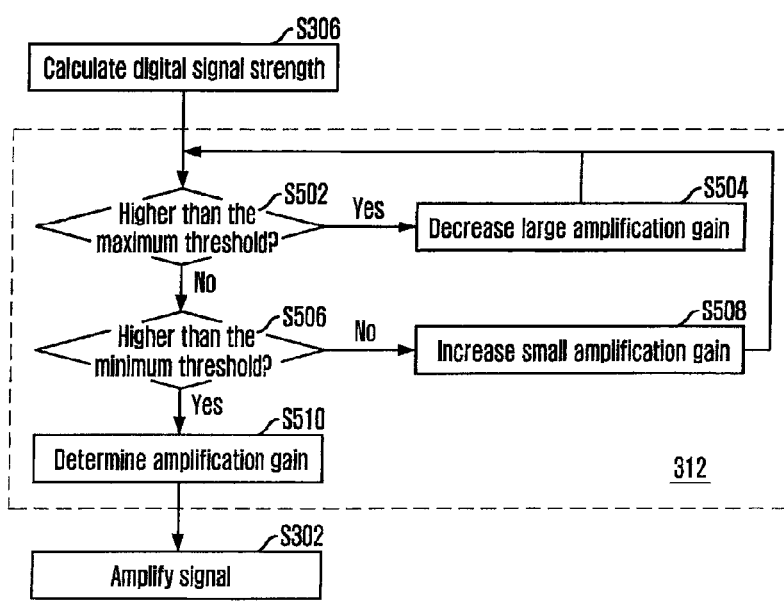
Figure 5C:
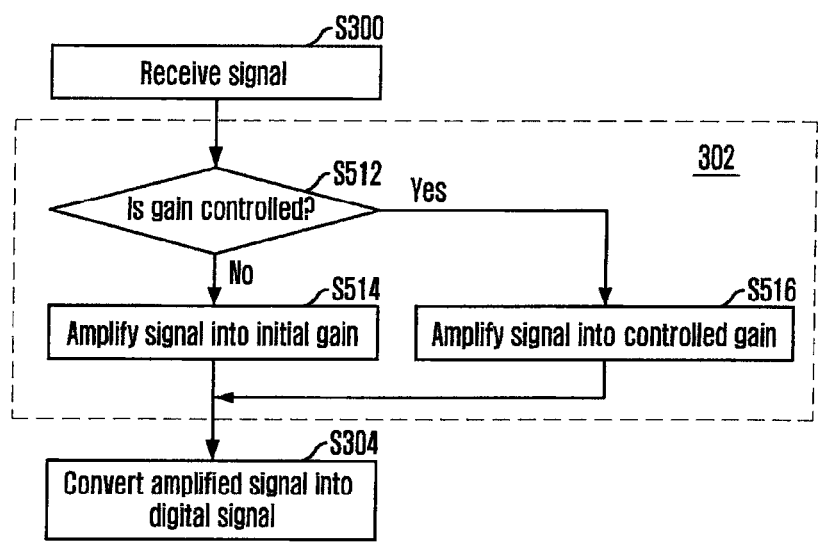

FIGS. 5A to 5C are flowcharts describing a method for controlling the amplification gain for the digital signal to be within the threshold range in accordance with an embodiment of the present invention.

FIG. 5A shows a signal and a threshold range in accordance with the present invention and shows a digital conversion range, a threshold range, the maximum threshold, and the minimum threshold to be easily recognizable.

FIG. 5B is a flowchart describing the method for controlling the digital signal to be within the maximum threshold range of conversion in the procedure of calculating the digital signal strength at step S306 and controlling the amplification gain.

It is determined at step S502 whether the digital signal is higher than the maximum threshold based on the calculated digital signal strength. When the digital signal is higher than the maximum threshold, the amplification gain decreases at step S504. Otherwise, a logic flow goes to a step S506 of determining whether the digital signal is higher than the minimum threshold. When the digital signal is lower than the minimum threshold, the amplification gain increases a little at step S508. Otherwise, the amplification gain is determined at step S510.

That is, the amplification gain is determined in the manner that the digital signal is lower than the maximum threshold and higher than the minimum threshold within the threshold range. Accordingly, the digital signal strength can be exactly measured at step S306 by preventing cases that the digital signal is distorted when the digital signal is higher than the maximum threshold of digital conversion and the digital conversion range is not sufficiently applied when the digital signal is lower than the minimum threshold.

A signal is amplified into the determined amplification gain at step S302. These successive procedures are performed in the preamble part of the reception packet as described above and the rest part of the reception packet is amplified into the determined amplification gain.

FIG. 5C is a flowchart describing a method for determining an amplification gain of an initially incoming signal before performing the above procedure.

It is checked at step S512 whether the gain is controlled at the signal amplifying step S302. When the gain is controlled, the signal is amplified into the controlled gain at step S516. Otherwise, the signal is amplified into the pre-determined initial gain at step S514. When the initial gain is determined, the amplification gain is automatically controlled through the amplification gain controlling step S312. The amplified signal is converted into a digital signal at step S304.

Figure 6:
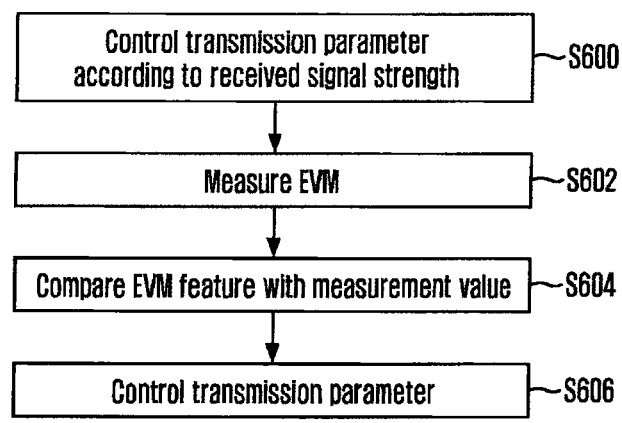
FIG. 6 is a flowchart describing a method for controlling a transmission parameter using an error measurement value in accordance with an embodiment of the present invention.

FIG. 6 is a flowchart describing a method for controlling a transmission parameter using an error measurement value in accordance with an embodiment of the present invention. Error vector magnitude (EVM) showing an error value between an actually transmitted symbol and an ideal reference symbol as a vector size may be used as an error measurement value. EVM will be described in detail hereinafter with reference to FIG. 12.

An EVM value is measured at the transmission parameter controlling step S310 in detail, and can be applied to control the transmission parameter. The transmission parameter is controlled according to the received signal strength at step S600 and the EVM is measured in a long training field (LTF) or signal field of the received packet at step S602.

An EVM feature according to the acquired received signal strength is compared with the measured EVM at step S604. That is, this method exactly corrects the received signal strength measured at the received signal strength calculating step S308 through EVM by previously figuring out the level of EVM with respect to the received signal strength according to the feature of the RF block. The measurement result of the EVM feature according to the received signal strength will be described with reference to FIG. 16.

At step S606, the transmission parameter is controlled through the received signal strength corrected by measuring the error such as EVM. Accordingly, the received signal strength can be exactly measured and efficient link adaptation is possible.

Figure 7:
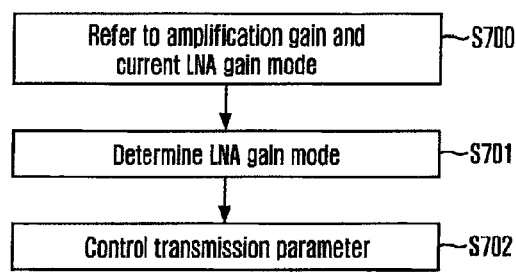
FIG. 7 is a flowchart describing a method for controlling a transmission parameter according to a Low Noise Amplifier (LNA) gain mode in accordance with an embodiment of the present invention.

FIG. 7 is a flowchart describing a method for controlling a transmission parameter according to an LNA gain mode in accordance with an embodiment of the present invention.

The commercialized RF block divides the LNA gain into one to three modes, e.g., High, Medium and Low, according to the size and the performance of the RF block is changed according to the mode. That is, the EVM feature on the received signal strength is differed according to the LNA gain mode and a related embodiment will be described with reference to FIG. 16.

In accordance with an embodiment of the present invention, efficient link adaptation is performed by referring to the amplification gain and the current LNA gain mode at step S700, determining an LNA gain mode at step S701, and controlling the transmission parameter according to the determined LNA gain mode at step S702.

Figure 8:
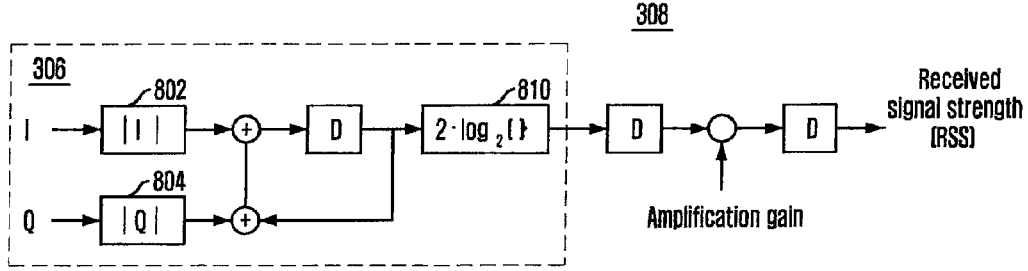
FIG. 8 shows a procedure of calculating the received signal strength in accordance with an embodiment of the present invention.

FIG. 8 shows a procedure of calculating the received signal strength at step S308 in accordance with an embodiment of the present invention.

The digital signal is divided and inputted into I and Q of a real number part and an imaginary number part, and each size is acquired by taking an absolute value. The digital signal strength is calculated at step S306 by taking a log format through a block 810. Subsequently, the received signal strength is calculated by subtracting the amplification gain as described in FIG. 4.

In accordance with an embodiment of the present invention, the measured received signal strength is stored as 4 different Received Signal Strength Indicator (RSSI) values in a readable register. The signal strength is measured for each 0.8 us and becomes 16 samples as a 20 MHz rate reference. When the modem is a reception mode, the received signal is continuously measured. However, when the RSSI value is latched as a readable register in a section of estimating Carrier Frequency Offset (CFO) based on Short Training Field (STF), the gain controlling step S312 goes to the end. The latched value should be maintained until a next new value is acquired. Signal strength-based carrier sensing is performed in this section. The presence of the signal in the channel is determined based on the received signal strength calculated for the carrier sensing period after comparing with predetermined threshold.

Figure 9:
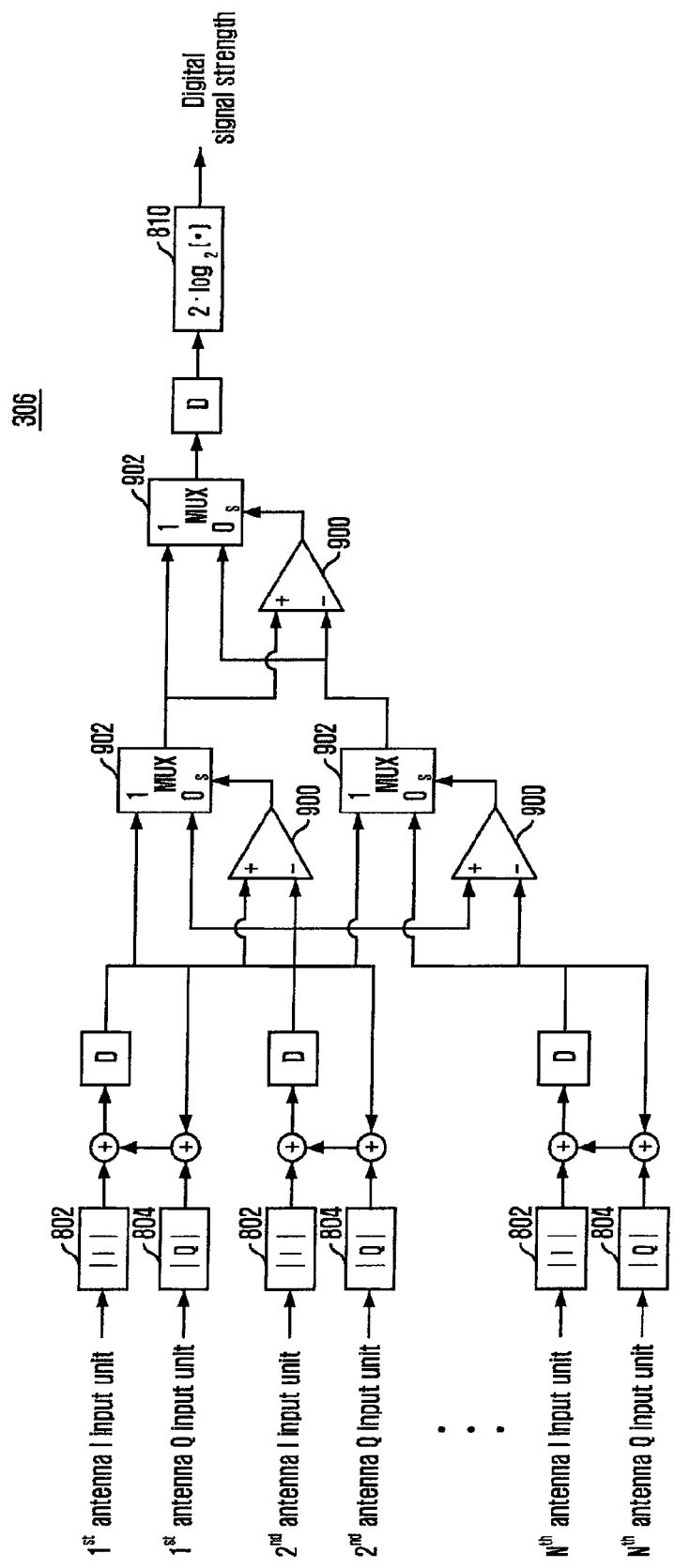
FIG. 9 is a block diagram showing a procedure of calculating digital signal strength in a multiple antenna wireless communication system in accordance with an embodiment of the present invention.

FIG. 9 is a block diagram showing a procedure of calculating digital signal strength in a multiple antenna wireless communication system in accordance with an embodiment of the present invention.

In case of the multiple antenna system, blocks for calculating the digital signal strength at the step S306 of FIG. 8 are connected to each antenna. Subsequently, the largest signal is detected through a comparator 900 and the digital signal strength is calculated by taking the log format through a block 810.

Figure 10:
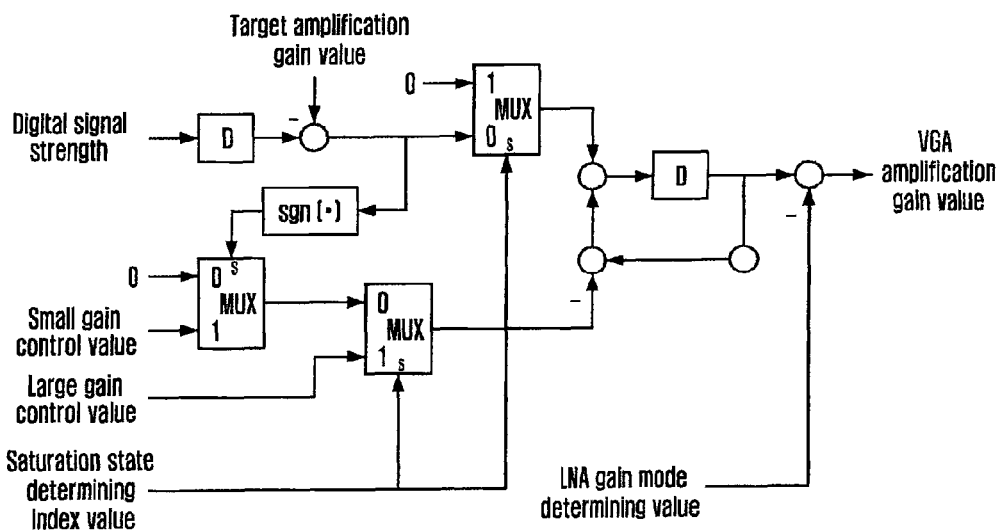
FIG. 10 is a block diagram showing a procedure of calculating Variable Gain Amplifier (VGA) amplification gain based on the digital signal strength and the LNA gain mode for the digital signal to be within the threshold range in accordance with an embodiment of the present invention.

FIG. 10 is a block diagram showing a procedure of calculating VGA amplification gain based on the digital signal strength and the LNA gain mode for the digital signal to be within the threshold range in accordance with an embodiment of the present invention.

A saturation state determining index value shows whether the digital signal strength is higher than the maximum threshold of digital conversion. The large gain is controlled according to the saturation state determining index value and the small gain is controlled by comparing the measured signal strength with a target amplification gain value. The gain to be amplified by the VGA is determined by subtracting the gain shown in the LNA gain mode from the determined amplification gain.

Figure 11:
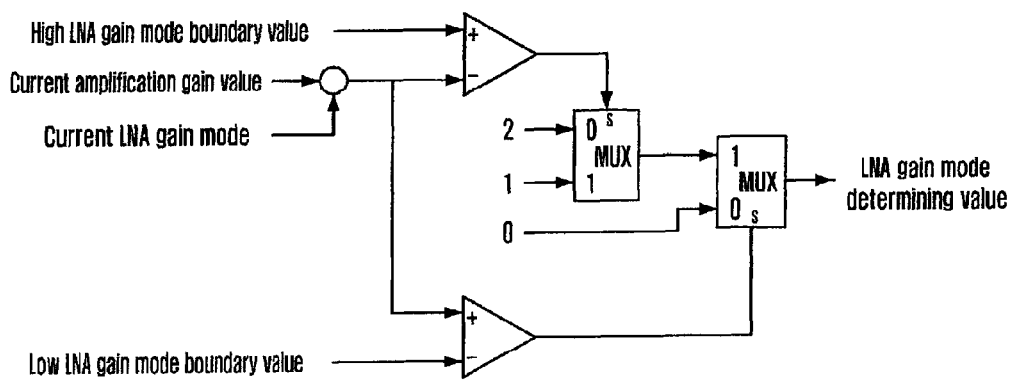
FIG. 11 is a block diagram showing a procedure of determining a control level of the LNA gain mode based on the current LNA gain mode and the amplification gain and determining an LNA gain mode in accordance with an embodiment of the present invention.

FIG. 11 is a block diagram showing a procedure of determining a control level of the LNA gain mode based on the current LNA gain mode and the amplification gain and determining a LNA gain mode in accordance with an embodiment of the present invention.

Figure 12:
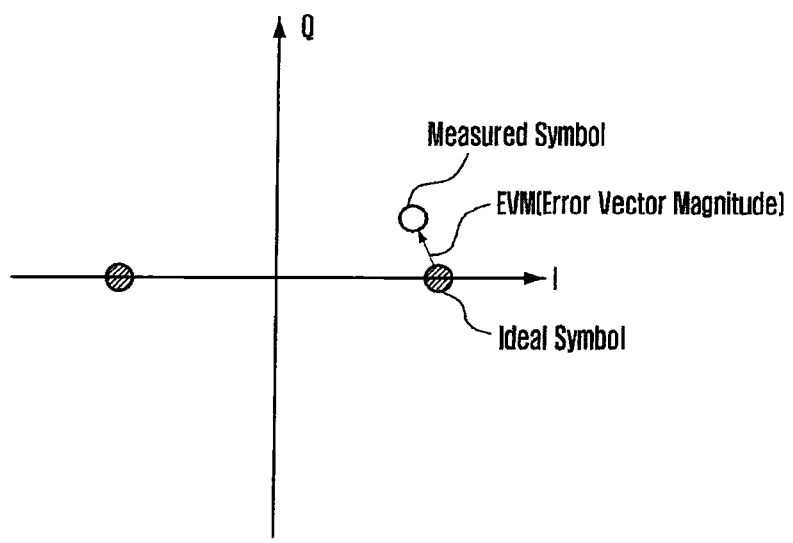
FIG. 12 is an IQ diagram showing definition of error vector magnitude (EVM) in accordance with an embodiment of the present invention.

FIG. 12 is an IQ diagram showing definition of EVM in accordance with an embodiment of the present invention.

The EVM shows an error value between an actually transmitted symbol and an ideal reference symbol as a vector size and is calculated by Equation 1.

$$EVM_{dB} = 20\log_{10}\sqrt{\frac{\sum_{k=1}^{N}|M(k)-I(k)|^2}{\sum_{k=1}^{N}|I(k)|^2}} \qquad \text{Eq. 1}$$

where M represents a signal measured after correcting time offset and frequency offset; I represents an ideal signal; N represents the number of measured samples; and k represents an index number of the sample.

The EVM is generally expressed on the basis of % or dB and small EVM means that the received signal is close to the ideal signal.

Figure 13:
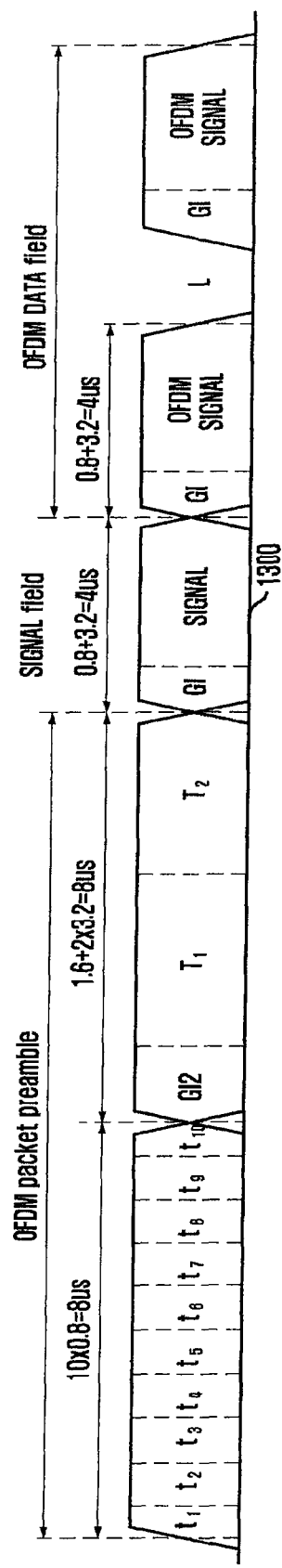
FIG. 13 shows an Institute of Electrical and Electronics Engineers (IEEE) 802.11a packet configuration in accordance with an embodiment of the present invention.

FIG. 13 shows an IEEE 802.11a packet configuration in accordance with an embodiment of the present invention.

As shown in the packet configuration according to IEEE 802.11a standard, the amplification gain controlling step S312 and the received signal strength calculating step S308 are performed in an OFDM packet preamble part. The transmission parameter controlling step S608 is performed by measuring EVM in a SIGNAL field.

Figure 14:
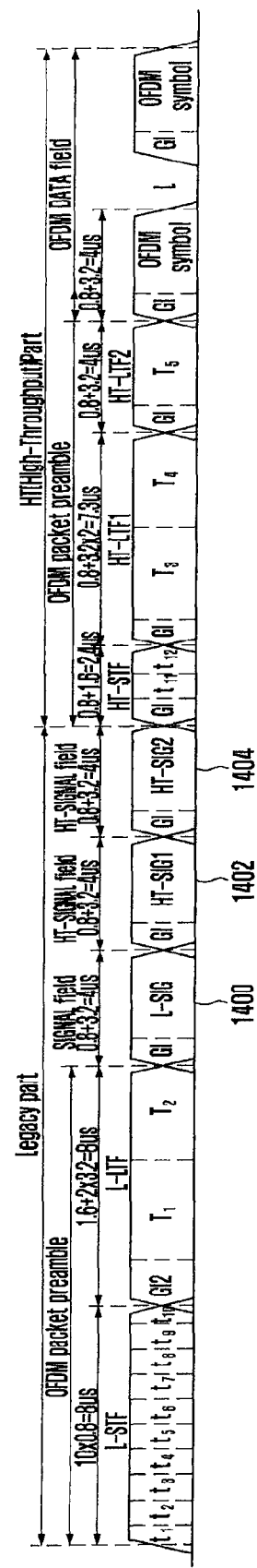
FIG. 14 shows an IEEE 802.11n packet configuration in accordance with an embodiment of the present invention.

FIG. 14 shows an IEEE 802.11n packet configuration in accordance with an embodiment of the present invention.

An IEEE 802.11n packet includes a Legacy part and an HT High-Throughput part. The Legacy part is compatible with a conventional IEEE 802.11a packet. It is preferred to use the Legacy part for compatibility with the conventional standard but it is also possible to use the High-Throughput part.

That is, it is possible to improve compatibility by using L-SIG 1400 and Legacy SIGNAL fields as a part of measuring the EVM. It is also possible to be realized to use HT-SIG1 1402, High-Throughput SIGNAL field1 or HT-SIG2 1404.

Figure 15:
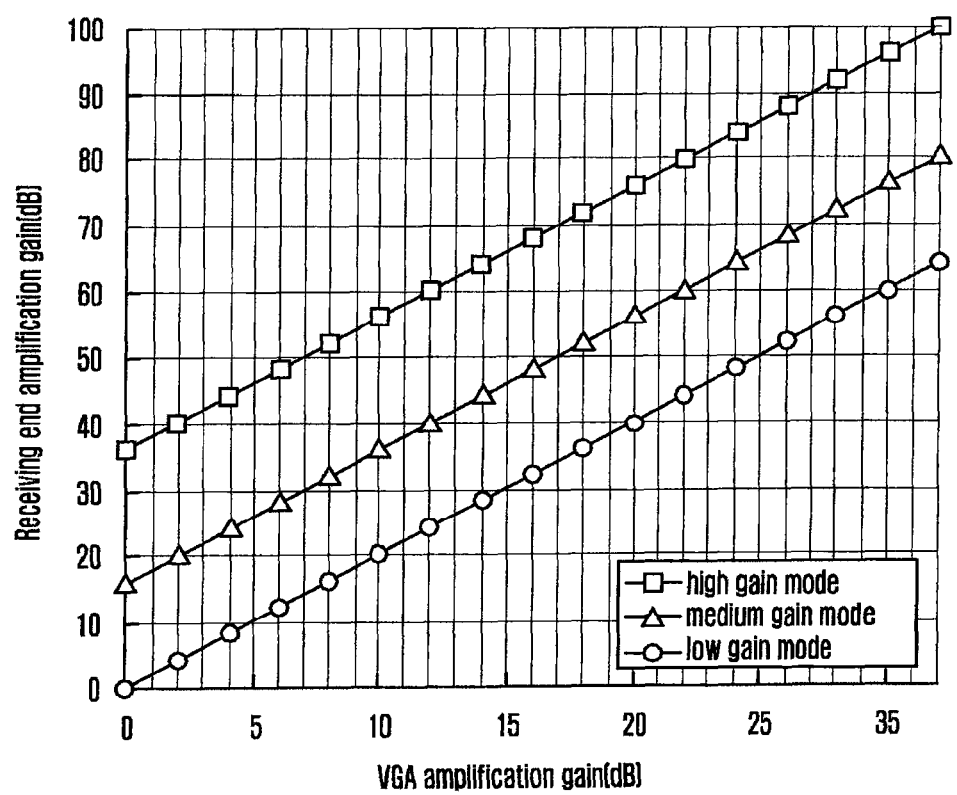
FIG. 15 is a result graph illustrating that the RF block determines the VGA amplification gain in accordance with an embodiment of the present invention.

FIG. 15 is a result graph illustrating that the RF block determines the VGA amplification gain in accordance with an embodiment of the present invention.

According to the LNA gain mode of High, Medium and Low, the amplification gain of the receiving end with respect to the VGA amplification gain is measured and shown. The result graph is applied to the amplification gain controlling step S312 by measuring the amplification gain before realizing the system.

Figure 16:
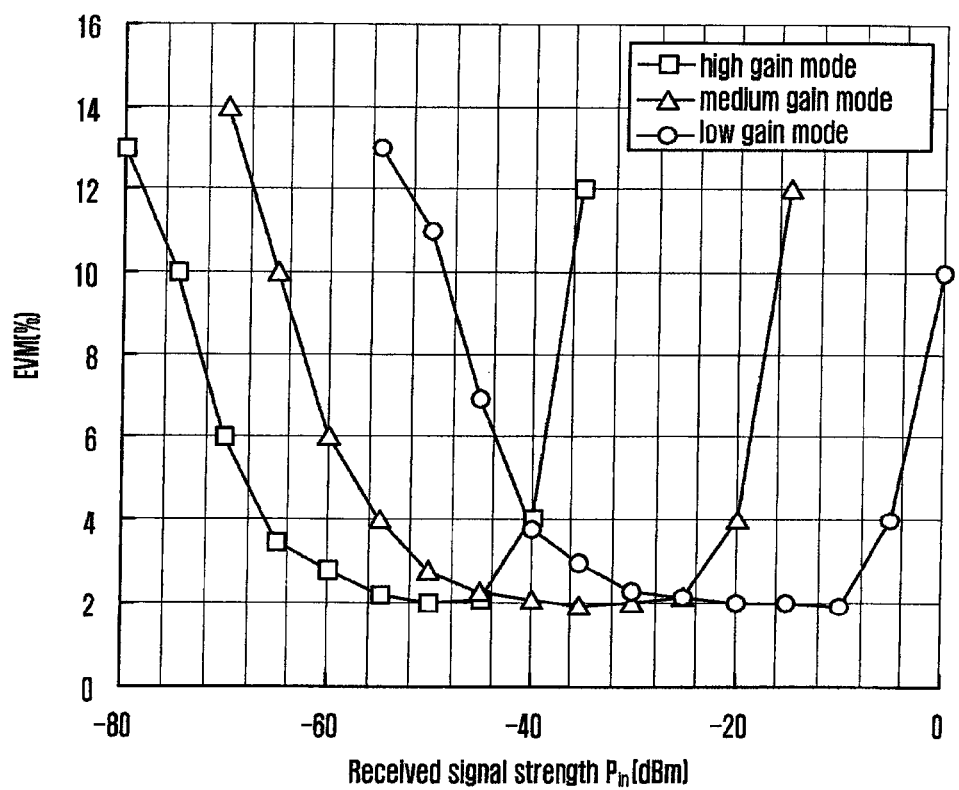
FIG. 16 is a graph illustrating an EVM feature of a Radio Frequency (RF) block on the basis of % unit by measuring an EVM feature of the RF block with respect to the received signal strength in accordance with an embodiment of the present invention.

FIG. 16 is a graph illustrating an EVM feature of the RF block on the basis of % unit by measuring EVM feature of the RF block with respect to the received signal strength in accordance with an embodiment of the present invention.

The EVM value is changed according to the LNA gain mode in the same received signal strength. In accordance with the present invention, the measured received signal strength can be corrected by comparing the EVM value measured in the EVM measuring step S602 with the pre-measured values in the graph of FIG. 16.

The feature measured before realizing the system is applied to determine how the transmission parameter is controlled according to the LNA gain mode in the transmission parameter controlling step S310.

Figure 17:
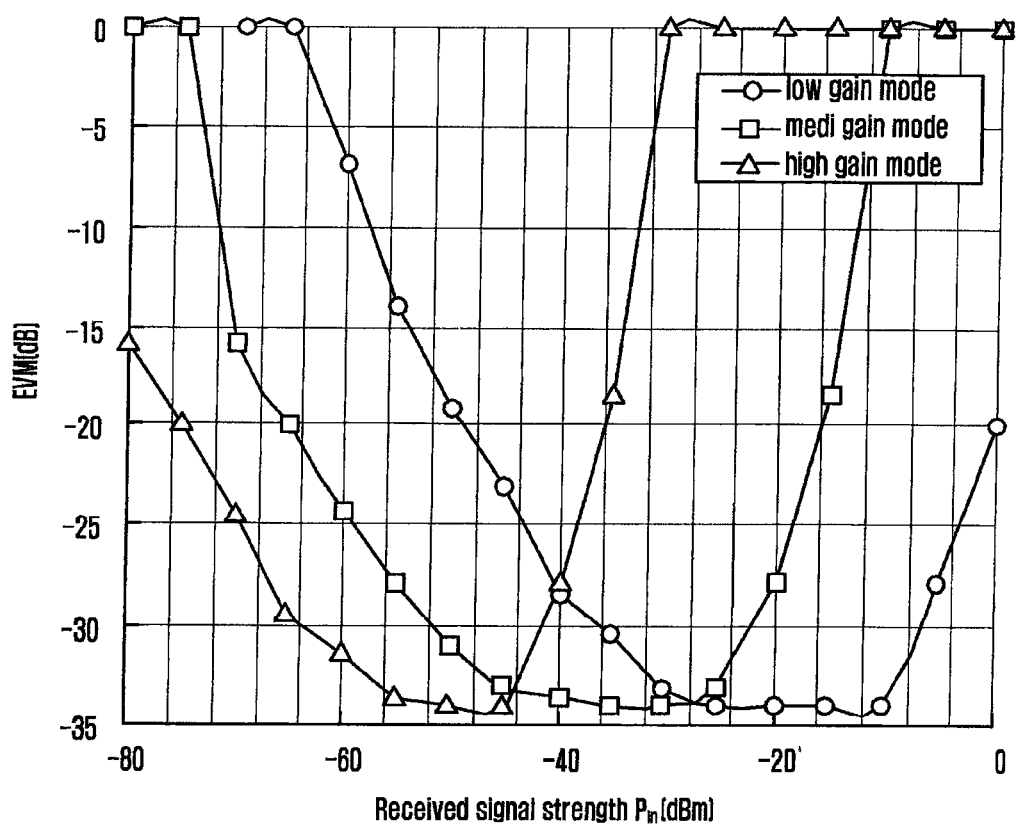
FIG. 17 is a graph illustrating an EVM feature of the RF block with respect to the received signal strength on the basis of dB unit by measuring the EVM feature in accordance with an embodiment of the present invention.

FIG. 17 is a graph illustrating an EVM feature of the RF block with respect to the received signal strength on the basis of dB unit by measuring the EVM feature in accordance with an embodiment of the present invention.

Figure 18:
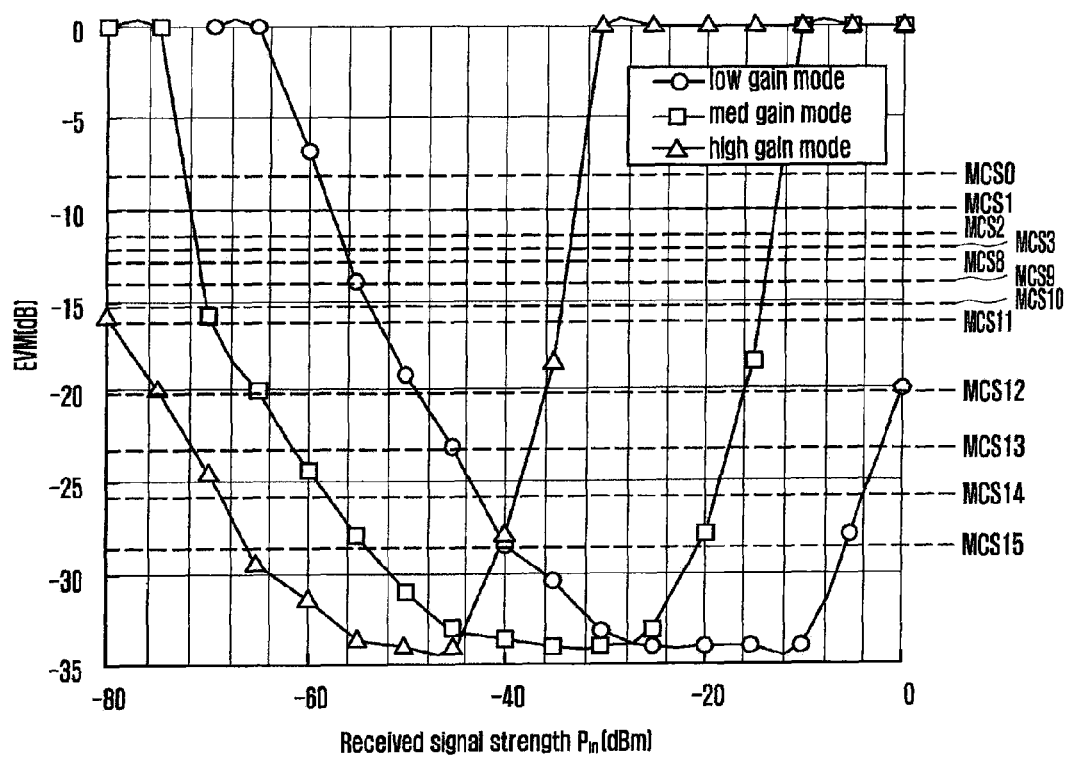
FIG. 18 is a graph for modulation and coding selection (MCS) level definition in accordance with an embodiment of the present invention.

FIG. 18 is a graph for MCS level definition in accordance with an embodiment of the present invention.

In defining the MCS level for the transmission parameter controlling step S310 in accordance with an embodiment of the present invention, FIG. 18 shows a method for defining the MCS level according to each EVM size based on the measured EVM feature. In other words, the larger the EVM becomes, the larger a gap with the ideal signal gets. Accordingly, the MCS level is defined by decreasing the transmission speed or the code rate.

FIG. 18 shows a case of a 2-stream 2-channel mode and the MCS level is divided into 16 levels of 0 to 15. The features on the received signal strength are changed according to the LNA gain mode and the MCS level of the same received signal strength is changed according to the LNA gain mode and the EVM value.

Figure 19:
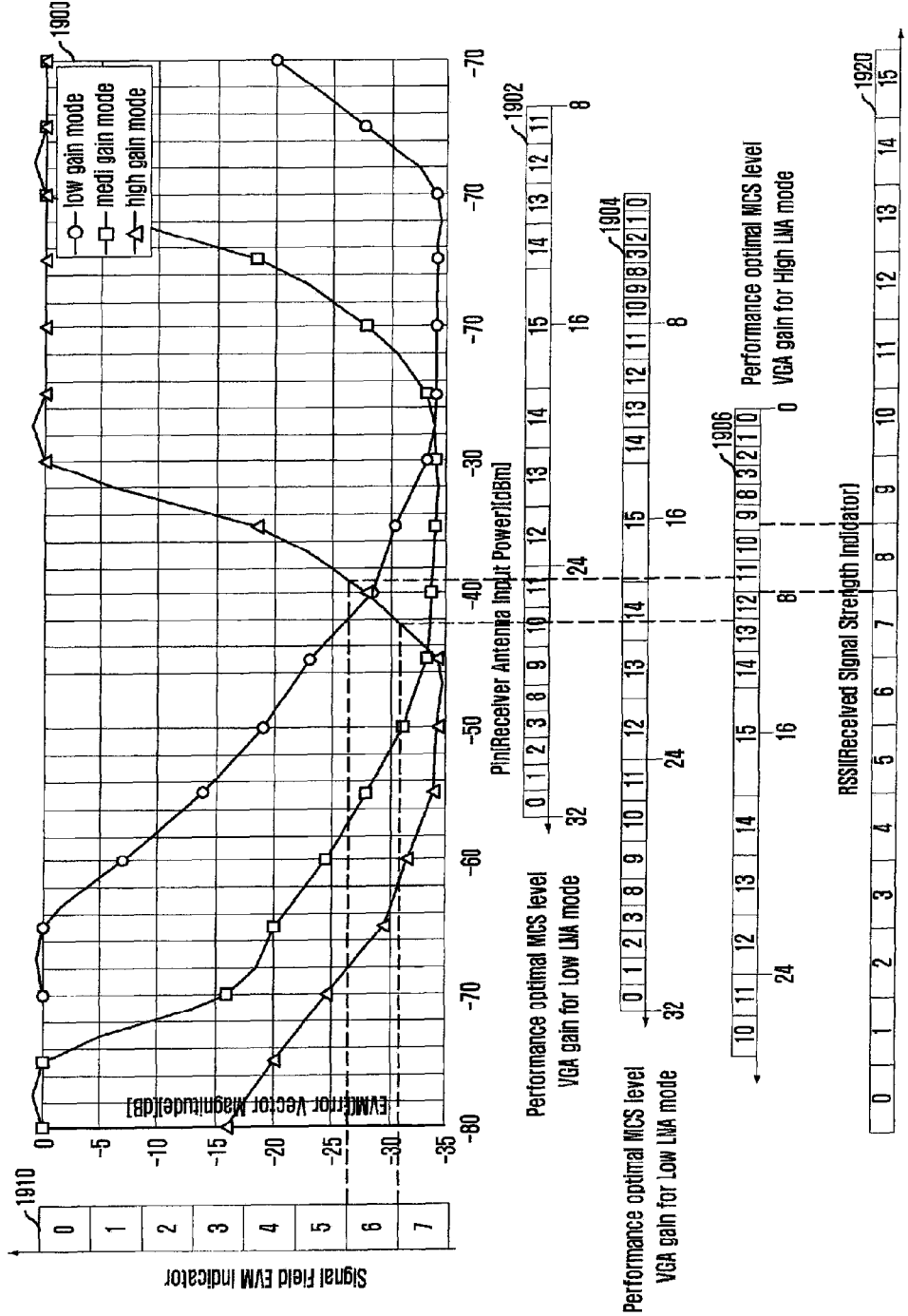
FIG. 19 is a graph for MCS determination according to an LNA gain mode, a VGA amplification gain, and received signal strength, and MCS determination according to the EVM measurement value in accordance with an embodiment of the present invention.

FIG. 19 is a graph for MCS determination according to the LNA gain mode, the VGA amplification gain, and the received signal strength, and MCS determination according to the EVM measurement value in accordance with an embodiment of the present invention.

A performance optimal MCS level is determined by the LNA gain mode of low 1902, medium 1904, and high 1906. When compared with an EVM feature 1900, the EVM feature is changed according to the LNA gain mode in the same received signal strength. Accordingly, the MCS level is determined according to the above method.

In accordance with an embodiment of the present invention, the EVM measurement value and the received signal strength are divided into 8 levels (see 1910) and 16 levels (see 1920), respectively. These levels are displayed and controlled as Indicator.

For example, when the received signal strength Indicator of the RSSI 1920 acquired in the received signal strength calculating step S308 is 8 and the LNA gain mode determined in the amplification gain controlling step S312 is high, the MCS levels are determined to range 9 to 11 properly to the RSSI 8 and the LNA gain mode high 1906. Subsequently, when the value designated by the EVM Indicator is 6 by measuring EVM at the step S602, the corresponding MCS level is searched by comparing an EVM feature 1900 in the proper LNA gain mode with the EVM Indicator. In this embodiment, MCS level becomes 11 as expressed in a dotted line of FIG. 19. The transmission parameter is searched in Table 2 corresponding to the MCS level determined in detail and is transmitted after being controlled at the step S608.

FIG. 19 shows the detailed operation procedure of the present invention. However, level division of the RSSI 1900 and the EVM Indicator 1910, MCS level determination, and the EVM feature 1900 are changeable according to the system to be realized. When the RSSI 1900 is segmentalized and the exactness of the received signal strength is secured, efficient link adaptation is possible without using the EVM feature 1900 after performing the received signal strength calculating step S308.

Figure 20:
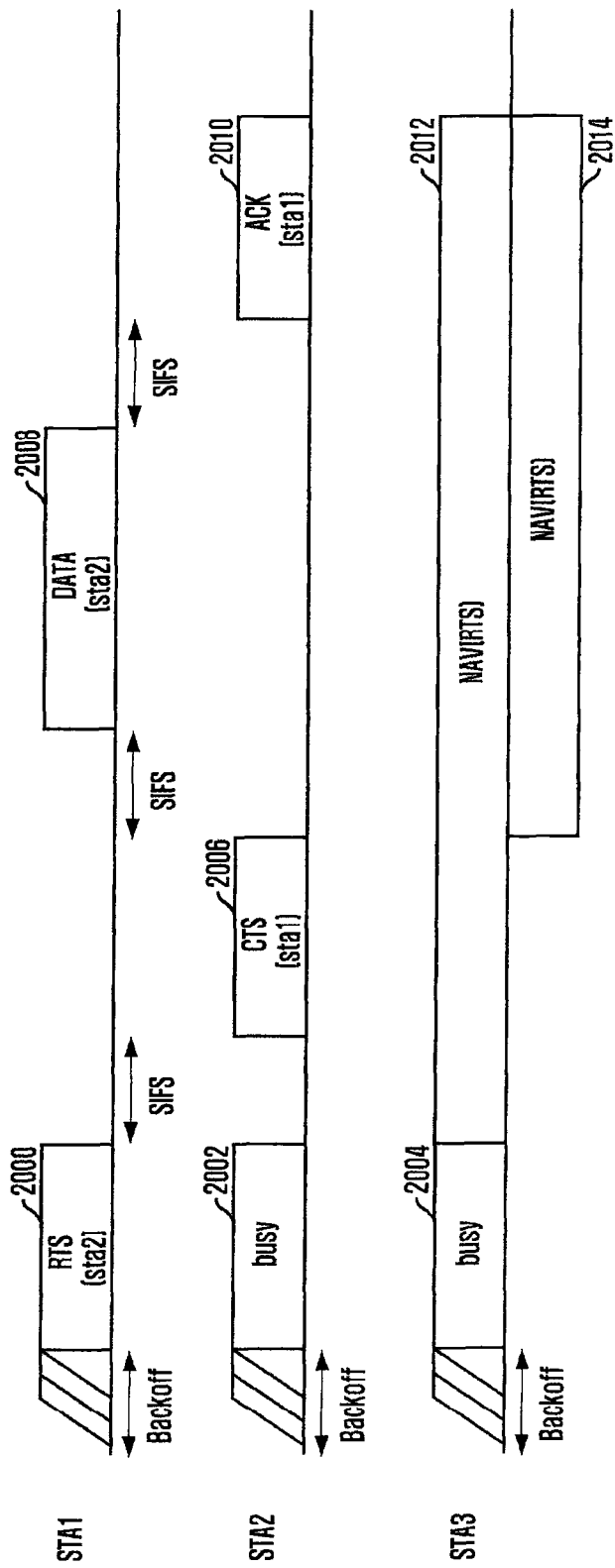
FIG. 20 shows a transmission/reception protocol of a wireless Local Area Network (LAN) packet in accordance with an embodiment of the present invention.

FIG. 20 shows a transmission/reception protocol of a wireless Local Area Network (LAN) packet in accordance with an embodiment of the present invention.

STA1, STA2 and STA3 show individual stations. When STA1 sends a Ready To Send (RTS) 2000 signal to STA2, STA2 sends a Clear To Send (CTS) 2006 signal after short inter frame space (SIFS). STA1 sends DATA 2008 to STA2 after SIFS and STA2 sends acknowledgement ACK 2010 for notifying normal reception after SIFS.

The wireless communication system in accordance with the embodiment of the present invention is operated as transmission/reception protocol as described above. STA1 and STA2 adopt the link adaptation method suggested in the present invention while transmitting/receiving the signals such as RTS 2000, CTS 2006, DATA 2008, and ACK 2010.

According to the configuration of the present invention described above, the present invention is faster than the generally used ARF method and can easily realize hardware in comparison with the method using SNR. Also, the present invention can exactly measure received signal strength without using an individual ADC before the amplifying unit of the receiving end as the conventional method using the received signal strength by suggesting the method for measuring the received signal strength based on the amplification gain and the digital signal strength inputted into the modem. Accordingly, the communication system can efficiently perform link adaptation and increase transmission speed, processing load, and frequency efficiency by optimizing diverse transmission parameters according to the channel state.

Also, the present invention can improve exactness of link adaptation by comparing the error measurement value such as error vector magnitude (EVM) with the error feature according to the received signal strength and can be applied to the wireless communication systems including a multiple input multiple output (MIMO) antenna system.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to the specific embodiments, it will be apparent to those skilled in the art that various changes and modifications may be made without departing from the spirit and scope of the invention as defined in the following claims.

What is claimed is:

1. A link adaptation method of a wireless communication system, comprising:
amplifying a received analog signal of a forward channel by an amplification gain, and converting the amplified signal into a digital signal;
calculating a digital signal strength of the digital signal;
calculating a received signal strength of the received analog signal by removing the amplification gain from the digital signal strength of the digital signal; and
controlling transmission parameters of a reverse channel according to the calculated received signal strength,
wherein the controlling the transmission parameters comprises:
determining a low noise amplifier (LNA) gain mode based on a current LNA gain mode and the amplification gain;
measuring an error of the received analog signal to determine an error vector magnitude (EVM);
selecting a transmission mode based on the EVM, the received signal strength of the received analog signal, and the determined LNA gain mode, wherein the selected transmission mode specifies values for the transmission parameters, and wherein the transmission parameters comprise a transmission speed, a modulation method, and a code rate; and
controlling the transmission parameters of the reverse channel according to the selected transmission mode.

2. The method of claim 1, further comprising:
controlling the amplification gain based on the digital signal strength,
where the amplification gain is controlled such that the digital signal is to be within a threshold range.

3. The method of claim 1, wherein the wireless communication system uses multiple antennas.

4. The method of claim 1, wherein the removing the amplification gain from the digital signal strength comprises subtracting the amplification gain from the digital signal strength.

5. The method of claim 1, wherein the removing the amplification gain from the digital signal strength comprises dividing the digital signal strength by the amplification gain.

6. A link adaptation system of a wireless communication system, comprising:
a received signal strength measuring means for amplifying a received analog signal of a forward channel by an amplification gain, converting the amplified signal into a digital signal, calculating a digital signal strength of the digital signal, and calculating a received signal strength of the received analog signal by removing the amplification gain from the digital signal strength of the digital signal; and
a transmission parameter control means for controlling transmission parameters of a reverse channel according to the calculated received signal strength,
wherein the transmission parameter control means controls the transmission parameters by:
determining a low noise amplifier (LNA) gain mode based on a current LNA gain mode and the amplification gain;
measuring an error of the received analog signal to determine an error vector magnitude (EVM);
selecting a transmission mode based on the EVM, the received signal strength of the received analog signal, and the determined LNA gain mode, wherein the selected transmission mode specifies values for the transmission parameters, and wherein the transmission parameters comprise a transmission speed, a modulation method, and a code rate; and controlling the transmission parameters of the reverse channel according to the selected transmission mode.

7. The link adaptation system of claim 6, wherein the received signal strength measuring means comprises a gain control unit for controlling the amplification gain based on the digital signal strength, where the gain control means controls the amplification gain such that the digital signal is to be within a threshold range.

8. The link adaptation system of claim 6, wherein the removing the amplification gain from the digital signal strength comprises subtracting the amplification gain from the digital signal strength.

* * * * *